United States Patent
Odagawa et al.

(10) Patent No.: US 11,746,201 B2
(45) Date of Patent: Sep. 5, 2023

(54) GAS BARRIER POLYMER AND GAS BARRIER LAMINATE USING SAME

(71) Applicant: MITSUI CHEMICALS TOHCELLO, INC., Tokyo (JP)

(72) Inventors: Kenji Odagawa, Sodegaura (JP); Shingo Suzuki, Koga (JP); Eiichi Moriya, Koga (JP)

(73) Assignee: MITSUI CHEMICALS TOHCELLO, INC., Tokyo (JP)

(*) Notice: Subject to any disclaimer, the term of this patent is extended or adjusted under 35 U.S.C. 154(b) by 132 days.

(21) Appl. No.: 17/418,301

(22) PCT Filed: Dec. 23, 2019

(86) PCT No.: PCT/JP2019/050381
§ 371 (c)(1),
(2) Date: Jun. 25, 2021

(87) PCT Pub. No.: WO2020/137982
PCT Pub. Date: Jul. 2, 2020

(65) Prior Publication Data
US 2022/0089825 A1    Mar. 24, 2022

(30) Foreign Application Priority Data
Dec. 26, 2018 (JP) .................. 2018-243757

(51) Int. Cl.
*C08J 7/048* (2020.01)
*C08F 20/06* (2006.01)
(Continued)

(52) U.S. Cl.
CPC ............ *C08J 7/048* (2020.01); *C08F 20/06* (2013.01); *C08G 73/0206* (2013.01); *C08J 7/08* (2013.01)

(58) Field of Classification Search
CPC ... C08J 7/048; C08J 7/08; C08F 20/06; C08G 73/0206
See application file for complete search history.

(56) References Cited

U.S. PATENT DOCUMENTS 9,902,872 B2    2/2018    Pietsch et al.
2010/0143632 A1    6/2010    Djenadi et al.
(Continued)

FOREIGN PATENT DOCUMENTS

EP    3176234 A1    6/2017
JP    2005225940 A    8/2005
(Continued)

OTHER PUBLICATIONS

English machine translation of JP2013-010857. (Year: 2013).*
(Continued)

*Primary Examiner* — Michael C Miggins
(74) *Attorney, Agent, or Firm* — BUCHANAN INGERSOLL & ROONEY PC

(57) ABSTRACT

A gas barrier polymer is formed by heat-curing a mixture including polycarboxylic acid and a polyamine compound, in which, in an infrared absorption spectrum, when a straight line connecting a measurement point at 1493 $cm^{-1}$ and a measurement point at 1780 $cm^{-1}$ is set as a baseline, an absorption intensity at 1660 $cm^{-1}$ is set as I(1660), and an absorption intensity at 1625 $cm^{-1}$ is set as I(1625), R represented by Equation (1) is greater than 1.

$$R = I(1660)/I(1625) - \{-0.65 \times (\text{total amine/COOH}) + 0.4225\} \quad (1)$$

9 Claims, 5 Drawing Sheets

(51) Int. Cl.
*C08G 73/02* (2006.01)
*B29C 71/02* (2006.01)

(56) References Cited

U.S. PATENT DOCUMENTS

| | | |
|---|---|---|
| 2015/0086734 A1 | 3/2015 | Pietsch et al. |
| 2017/0210909 A1 | 7/2017 | Kidokoro et al. |
| 2017/0341352 A1 | 11/2017 | Kidokoro et al. |
| 2018/0126696 A1 | 5/2018 | Suzuki et al. |

FOREIGN PATENT DOCUMENTS

| | | |
|---|---|---|
| JP | 2013010857 A | 1/2013 |
| JP | 2014-184678 A | 10/2014 |
| JP | 2015526534 A | 9/2015 |
| WO | 2016088534 A1 | 6/2016 |
| WO | 2016/186074 A1 | 11/2016 |

OTHER PUBLICATIONS

Extended European Search Report dated Aug. 2, 2022, by the European Patent Office in corresponding European Application No. 19901463.0 (7 pages).
International Search Report (PCT/ISA/210) with an English translation, and Written Opinion (PCT/ISA/237) dated Jan. 28, 2020, by the Japanese Patent Office as the International Searching Authority for International Application No. PCT/JP2019/050381. (8 pages).
Junsei Chemical Co., Ltd., vol. 27, Apr. 3, 2007 [retrieved: Jan. 14, 2020], Internet: <URL: http://www.junsei.co.jp/upfile/topics/21/21-2.pdf> (Junsei News), and an English explanation. (3 pages).
Notice of Reasons for Refusal dated Mar. 29, 2022, by the Japanese Patent Office in corresponding Japanese Patent Application No. 2020-563256, and an English translation of the Notice. (6 pages).
Office Action dated Sep. 27, 2022, by the Japanese Patent Office in corresponding Japanese Patent Application No. 2020-563256. (2 pages).

* cited by examiner

GAS BARRIER POLYMER AND GAS BARRIER LAMINATE USING SAME

TECHNICAL FIELD

The present invention relates to a gas barrier polymer and a gas barrier laminate using the same.

BACKGROUND ART

As techniques related to gas barrier films, there are the techniques described in Patent Documents 1 to 3.

Patent Document 1 (Japanese Unexamined Patent Publication No. 2005-225940) describes a gas barrier film having a gas barrier layer formed of polycarboxylic acid and polyamine and/or polyol and in which the degree of cross-linking of the polycarboxylic acid is 40% or more. According to the same document, such gas barrier films are described as having excellent gas barrier properties even under high humidity conditions as well as under low humidity conditions.

Patent Document 2 (Japanese Unexamined Patent Publication No. 2013-10857) describes a technique relating to a gas barrier film which is a film in which a mixture of polyamine and polycarboxylic acid, which are mixed so as to be a specific weight ratio, is coated on at least one side of a base material formed of a plastic film and in which the oxygen permeability after a boiling treatment is in a specific range. According to the same document, using the film makes it possible to provide packaging materials with excellent gas barrier properties, in particular, oxygen-blocking properties, even after a boiling treatment, which have a gas barrier layer with excellent flexibility, transparency, moisture resistance, chemical resistance, and the like, and which also have a small environmental impact, without going through complicated steps.

In addition, as a technique for providing further compositions and methods capable of manufacturing polymer films having excellent oxygen barrier properties, in particular, excellent oxygen barrier properties in high humidity environments without the need to provide additional protective coatings, Patent Document 3 (Japanese Unexamined Patent Application Publication (Translation of PCT Application) No. 2015-526534) describes the use of an aqueous solution containing at least one polyanion and at least one polyethyleneimine to impart oxygen barrier properties to a polymer film, in which the polyanion is an acid group-containing polymer neutralized with at least one base selected from the group consisting of an inorganic base and a monovalent organic base and the acid group-containing polymer and the polyethyleneimine each have a specific mass average molecular weight.

RELATED DOCUMENT

Patent Document

[Patent Document 1] Japanese Unexamined Patent Publication No. 2005-225940

[Patent Document 2] Japanese Unexamined Patent Publication No. 2013-10857

[Patent Document 3] Japanese Unexamined Patent Application Publication (Translation of PCT Application) No. 2015-526534

SUMMARY OF THE INVENTION

Technical Problem

According to studies by the present inventors, the techniques described in Patent Documents 1 to 3 above had room for improvement in terms of obtaining, with good productivity, a gas barrier polymer having an excellent barrier property after a retort treatment.

The present invention provides a gas barrier polymer having excellent productivity and an excellent gas barrier property after a retort treatment.

Solution to Problem

According to the present invention, the gas barrier polymer and the gas barrier laminate shown below are provided.

[1]

A gas barrier polymer formed by heat-curing a mixture including polycarboxylic acid and a polyamine compound, in which, in an infrared absorption spectrum of the gas barrier polymer, when a straight line connecting a measurement point at 1493 $cm^{-1}$ and a measurement point at 1780 $cm^{-1}$ is set as a baseline, an absorption intensity at 1660 $cm^{-1}$ is set as I(1660), and an absorption intensity at 1625 $cm^{-1}$ is set as I(1625), R represented by Equation (1) is greater than 1, $$R=I(1660)/I(1625)-\{-0.65\times(\text{total amine/COOH})+0.4225\} \qquad (1)$$

(in Equation (1), "total amine" is a total number of moles of primary, secondary, and tertiary amino groups included in the polyamine compound in the mixture, and "COOH" is the number of moles of —COOH groups included in the polycarboxylic acid in the mixture).

[2]

The gas barrier polymer according to [1], in which the polycarboxylic acid includes one or two or more polymers selected from the group consisting of polyacrylic acid, polymethacrylic acid, and a copolymer of acrylic acid and methacrylic acid.

[3]

The gas barrier polymer according to [1] or [2], in which the polyamine compound includes a branched polyamine.

[4]

The gas barrier polymer according to any one of [1] to [3], in which (total amine/COOH) in Equation (1) is equal to or more than 0.4 and equal to or less than 0.7.

[5]

The gas barrier polymer according to any one of [1] to [4], in which (total of the number of moles of —NH groups and the number of moles of —$NH_2$ groups included in the polyamine compound in the mixture)/(the number of moles of —COOH groups included in the polycarboxylic acid in the mixture)=0.28 to 0.5.

[6]

The gas barrier polymer according to any one of [1] to [5], in which, in the infrared absorption spectrum of the gas barrier polymer, when a straight line connecting a measurement point at 1493 $cm^{-1}$ and a measurement point at 1780 $cm^{-1}$ is set as a baseline, a total peak area in a range of an absorption band of equal to or more than 1493 $cm^{-1}$ and equal to or less than 1780 $cm^{-1}$ is set as A, and a total peak area in a range of an absorption band of equal to or more than 1598 $cm^{-1}$ and equal to or less than 1690 $cm^{-1}$ is set as B, an area ratio of an amide bond as represented by (B/A) is less than 0.370.

[7]

A gas barrier laminate including a base material layer, and a gas barrier layer provided on at least one surface of the base material layer and including the gas barrier polymer according to any one of [1] to [6].

Advantageous Effects of Invention

According to the present invention, it is possible to obtain a gas barrier polymer having excellent productivity and an excellent gas barrier property after a retort treatment.

DESCRIPTION OF EMBODIMENTS

Figure 1:
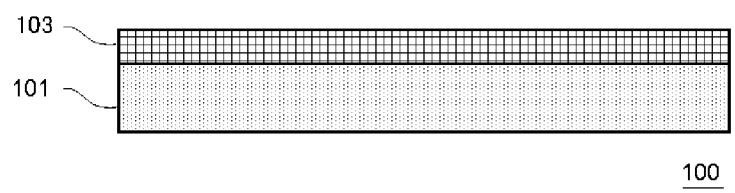
FIG. 1 is a cross-sectional view schematically showing a configuration of a gas barrier laminate in an embodiment.

Description will be given below of embodiments of the present invention with reference to the drawings. Note that, the figures are schematic views and do not match the actual size ratios. Note that, "to" between numbers in the sentences means "equal to or more than first number and equal to or less than second number" unless otherwise noted.

(Gas Barrier Polymer)

The gas barrier polymer according to the present embodiment is formed by heat-curing a mixture including polycarboxylic acid and a polyamine compound. Then, in the infrared absorption spectrum of the gas barrier polymer, when a straight line connecting a measurement point at 1493 $cm^{-1}$ and a measurement point at 1780 $cm^{-1}$ is set as a baseline, an absorption intensity at 1660 $cm^{-1}$ is set as I(1660), and an absorption intensity at 1625 $cm^{-1}$ is set as I(1625), R represented by Equation (1) is greater than 1.

$$R = I(1660)/I(1625) - \{-0.65 \times (\text{total amine/COOH}) + 0.4225\} \quad (1)$$

(In Equation (1), "total amine" is a total number of moles of primary, secondary, and tertiary amino groups included in the polyamine compound in the mixture, and "COOH" is the number of moles of —COOH groups included in the polycarboxylic acid in the mixture).

In the present embodiment, in the infrared absorption spectrum of the gas barrier polymer, R represented by Equation (1) using the intensity ratio of I(1660) with respect to I(1625) satisfies specific conditions, thus, it is possible to obtain a gas barrier polymer having excellent productivity and an excellent gas barrier property after a retort treatment. More specifically, R satisfying the specific conditions makes it possible to obtain a gas barrier polymer with an excellent oxygen gas barrier property after a retort treatment in a short heat treatment time.

That is, the present inventors carried out intensive studies on a gas barrier polymer formed of a heat-cured mixture including polycarboxylic acid and a polyamine compound in order to improve the productivity and the gas barrier property after a retort treatment. As a result, it was found that the measure of the ratio of I(1660) with respect to I(1625) was effective as a design guideline for improving the productivity of the gas barrier polymer and the gas barrier property after a retort treatment.

More specifically, the gas barrier polymer formed of a heat-cured mixture including polycarboxylic acid and a polyamine compound is formed of a cross-linked body of the mixture including polycarboxylic acid and a polyamine compound. In this cross-linked body, there are two types of cross-linked structures present, ionic cross-linked and amide cross-linked, and it was found that controlling the distribution state of these cross-linked structures is important from the viewpoint of improving the gas barrier performance. Among the cross-linked structures, ionic cross-linking is generated by the acid-base reaction occurring between the carboxyl group included in the polycarboxylic acid and the amino group included in the polyamine compound. In addition, amide cross-linking is generated by a dehydration-condensation reaction occurring between the carboxyl group included in the polycarboxylic acid and the amino group included in the polyamine compound. When the present inventors carried out further studies, it was found that, in the two types of cross-linked structures described above, the formation state of the amide cross-linking is reflected at I(1625) and I(1660) in the IR spectrum of the cross-linked body and that using the measure of the ratio of I(1660) with respect to I(1625) as a design guideline makes it possible to efficiently form a cross-linked body with an excellent gas barrier property after a retort treatment in a short time.

It is considered that, R being greater than 1 in Equation (1) means that the amide cross-linking points are formed in a preferable distribution state in the cross-linked body, the gas barrier property of the cross-linked body after a retort treatment is excellent, and the cross-linked body is efficiently formed in a short heat treatment time.

Here, in Equation (1), I(1660) and I(1625) are specifically determined by the following method. That is, a 1 cm×3 cm sample for measurement is cut out from a gas barrier layer formed by the gas barrier polymer of the present embodiment. Next, the infrared absorption spectrum of the surface of the gas barrier layer is obtained by infrared total reflection measurement (ATR-IR method). Then, in the obtained infrared absorption spectrum, the measurement point at 1493 $cm^{-1}$ and the measurement point at 1780 $cm^{-1}$ are connected with a straight line (baseline: N) and the difference spectrum between the obtained infrared absorption spectrum and N is obtained and set as the spectrum ($S_{BN}$). However, in a case where the thickness of the gas barrier layer is approximately 0.5 μm or less, the measured infrared absorption spectrum includes the influence of the layer lower than the gas barrier layer. In such a case, a base material formed of only the lower layer without the gas barrier layer is also prepared as a measurement sample, the ATR-IR spectrum of the base material surface is obtained in the same manner, and the difference spectrum from the baseline N is obtained and set as the spectrum ($S_{SN}$) In the wavenumber range of from 1493 $cm^{-1}$ to 1780 $cm^{-1}$, the difference spectrum analysis is performed according to the following equation to obtain the spectrum ($S_{BN'}$) without the influence of the base material.

$$<\text{Spectrum}(S_{BN'})> = <\text{Spectrum}(S_{BN})> - \alpha^* <\text{Spectrum}(S_{SN})>$$

Here, α is a coefficient to exclude the influence of the base material and is 0≤α<1. A description will be given below of the specific method for determining α in the Examples section. In the spectrum ($S_{SN'}$) obtained through the analysis described above, the IR intensity at 1660 cm$^{-1}$ is I(1660) and the IR intensity at 1625 cm$^{-1}$ is I(1625).

In the present embodiment, it is possible to perform the measurement of the infrared absorption spectrum (infrared total reflection measurement: ATR method), for example, using an FT/IR-460 apparatus manufactured by JASCO Corporation mounted with a multi-reflection measurement unit ATR PRO410-M (prism: Germanium crystal, angle of incidence 45 degrees, number of multiple reflections=5), at conditions of room temperature, a resolution of 2 cm$^{-1}$, and a number of integrations of 150 times.

In addition, in Equation (1), "−{−0.65×(total amine/COOH)+0.4225}" is a correction factor.

(Total amine/COOH) is the ratio of the number of moles of total amine components with respect to the number of moles of carboxyl groups in the gas barrier composition and it is possible to carry out the calculation thereof from the blending ratio of polycarboxylic acid and polyamine compounds. On the other hand, in a case where the blending ratio is unknown, it is possible to carry out the determination approximately by analyzing the composition of the gas barrier polymer, for example. Specifically, when the gas barrier polymer is formed by heat-curing a mixture of polyacrylic acid or polymethacrylic acid and a polyamine compound, determining the atomic ratio of N and O in the obtained gas barrier polymer by X-ray photoelectron spectroscopy (XPS) makes it possible to calculate (total amine/COOH) using the following equation.

(Total amine/COOH)=[N]/{0.5*[O]}

(In the above equation, [N] and [0] are the atomic ratios of N and O in the gas barrier polymer, respectively).

From the viewpoint of efficiently forming a cross-linked body with an excellent gas barrier property after a retort treatment in a short time, R represented in Equation (1) is greater than 1, preferably 1.01 or more, more preferably 1.05 or more, and even more preferably 1.10 or more.

In addition, although there is no limit on the upper limit of R, from the viewpoint of improving the productivity of the gas barrier polymer, R is, for example, 1.50 or less, and preferably 1.40 or less.

In addition, from the viewpoint of efficiently forming a cross-linked body with an excellent gas barrier property after a retort treatment in a short time, (total amine/COOH) in Equation (1) is preferably 0.4 or more, more preferably 0.43 or more, and even more preferably 0.45 or more.

In addition, from the same viewpoint, (total amine/COOH) in Equation (1) is preferably 0.7 or less, more preferably 0.65 or less, and even more preferably 0.6 or less.

In the present embodiment, it is possible to control R represented in Equation (1) by appropriately adjusting the manufacturing conditions of the gas barrier polymer. Examples of factors for controlling R include the type of polycarboxylic acid blended in the mixture, the structure and molecular weight of the polyamine compound blended in the mixture, a molar ratio reflecting the concentration of ionic cross-linking points in the mixture ((total of the number of moles of —NH groups and number of moles of —NH$_2$ groups included in the polyamine compound in the mixture)/(number of moles of —COOH groups included in the polycarboxylic acid in the mixture)) (also referred to in the present specification as "((NH$_2$+NH)/COOH))"), and the like. A description will be given below of specific examples of the method for manufacturing a gas barrier polymer.

In addition, when a straight line connecting the measurement point at 1493 cm$^{-1}$ and the measurement point at 1780 cm$^{-1}$ in the infrared absorption spectrum of the gas barrier polymer is set as the baseline N, and when, in the difference spectrum between the infrared absorption spectrum and N, the total peak area in a range of the absorption band of equal to or more than 1493 cm$^{-1}$ and equal to or less than 1780 cm$^{-1}$ is set as A and the total peak area in a range of the absorption band of equal to or more than 1598 cm$^{-1}$ and equal to or less than 1690 cm$^{-1}$ is set as B, the area ratio of the amide bonds represented by (B/A) is an index related to the ratio of the amide bond-derived components among C=O stretching vibration components in the gas barrier polymer. However, the infrared absorption spectrum of the gas barrier polymer is obtained by infrared total reflection measurement (ATR-IR method) of the infrared absorption spectrum of the surface of the gas barrier layer formed by the gas barrier polymer of the present embodiment. In addition, in a case where the measured infrared absorption spectrum includes the influence of the layer lower than the gas barrier layer, the influence of the lower layer is removed by the same analysis method as described above.

From the viewpoint of efficiently forming a cross-linked body with an excellent gas barrier property after a retort treatment in a short time, the area ratio of the amide bonds is preferably less than 0.370, more preferably 0.36 or less, and even more preferably 0.35 or less.

On the other hand, from the viewpoint of obtaining a cross-linked body with a good gas barrier property after a retort treatment, the area ratio (B/A) described above is, for example, 0.25 or more, and preferably 0.27 or more.

(Method for Manufacturing Gas Barrier Polymer)

The method for manufacturing a gas barrier polymer according to the present embodiment is different from the manufacturing methods of the related art. In order to obtain the gas barrier polymer according to the present embodiment, it is important to control to a high level the type of polycarboxylic acid blended in the mixture, the structure and molecular weight of the polyamine compound blended in the mixture, and the molar ratio of ((NH$_2$+NH)/COOH) in the mixture and to appropriately control the manufacturing conditions such as the method, temperature, and time of the heat treatment.

Specifically, mixtures including polycarboxylic acid and polyamine compounds which satisfy ((NH$_2$+NH)/COOH)<(total amine/COOH) and mixtures including polycarboxylic acids and polyamine compounds which satisfy [((NH$_2$+NH)/COOH)/(total amine/COOH)]<0.8 are preferable.

A description will be given of an example of the method for manufacturing a gas barrier polymer according to the present embodiment.

In the present embodiment, the gas barrier polymer includes, for example, a step of preparing a mixture including polycarboxylic acid and a polyamine compound, and a step of heat-curing the obtained mixture to obtain the gas barrier polymer. In addition, the manufacturing method may further include a step of coating the mixture at a predetermined thickness after the step of preparing the mixture and before the heat-curing step.

Specific examples of the polycarboxylic acid and polyamine compounds used in the step of preparing the mixture are shown below.

(Polycarboxylic Acid)

The polycarboxylic acid has two or more carboxy groups in the molecule. Specific examples of the polycarboxylic acid include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β- unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one type or two or more types of polymers selected from polyacrylic acid, polymethacrylic acid, and a copolymer of acrylic acid and methacrylic acid is more preferable, at least one type of polymer selected from polyacrylic acid and polymethacrylic acid is even more preferable, and at least one type of polymer selected from a homopolymer of acrylic acid or a homopolymer of methacrylic acid is yet more preferable.

Here, in the present embodiment, polyacrylic acid includes both homopolymers of acrylic acid and copolymers of acrylic acid and another monomer. In a case of a copolymer of acrylic acid and another monomer, the polyacrylic acid includes constituent units which are derived from acrylic acid at generally 90% by mass or more, preferably 95% by mass or more, and more preferably 99% by mass or more in 100% by mass of the polymer.

In addition, in the present embodiment, polymethacrylic acid includes both homopolymers of methacrylic acid and copolymers of methacrylic acid and another monomer. In a case of a copolymer of methacrylic acid and another monomer, the polymethacrylic acid includes constituent units which are derived from methacrylic acid at generally 90% by mass or more, preferably 95% by mass or more, and more preferably 99% by mass or more in 100% by mass of polymer.

In addition, in the present embodiment, the polycarboxylic acid is a polymer where carboxylic acid monomers are polymerized and the weight average molecular weight of the polycarboxylic acid is preferably $5 \times 10^4$ or more, more preferably $1.5 \times 10^3$ or more, even more preferably $2 \times 10^3$ or more, and yet more preferably $5 \times 10^3$ or more, from the viewpoint of excellent balance of the gas barrier property after a retort treatment and handleability.

On the other hand, from the viewpoint of improving the productivity of the gas barrier polymer, the weight average molecular weight of the polycarboxylic acid is preferably $2 \times 10^6$ or less, preferably $1.5 \times 10^6$ or less, and even more preferably $1.3 \times 10^6$ or less. Here, in the present embodiment, the molecular weight of the polycarboxylic acid is the polyethylene oxide conversion weight average molecular weight and is measurable using gel permeation chromatography (GPC).

(Polyamine Compound)

The polyamine compound according to the present embodiment is a polymer having two or more amino groups in the main chain, side chain or terminal. Specific examples thereof include aliphatic polyamines such as polyallylamine (PAAm), polyvinylamine (PVAm), polyethyleneimine (PEI), and poly(trimethyleneimine); polyamides having amino groups on side chains such as polylysine and polyarginine; and the like. In addition, a polyamine where a portion of the amino group is modified may be used. From the viewpoint of efficiently forming a cross-linked body with an excellent gas barrier property after a retort treatment in a short time, the polyamine preferably includes a branched polyamine such as branched polyethyleneimine (B-PEI), more preferably a branched polyamine, and even more preferably a branched polyethyleneimine.

From the viewpoint of improving the balance between the productivity of the gas barrier polymer and the gas barrier property after a retort treatment, the weight average molecular weight of the polyamine compound in the present embodiment is preferably $2 \times 10^3$ or more, and more preferably $5 \times 10^3$ or more.

In addition, from the same viewpoint, the weight average molecular weight of the polyamine compound is preferably $1 \times 10^5$ or less, more preferably $8 \times 10^4$ or less, and even more preferably $5 \times 10^4$ or less.

Here, in the present embodiment, it is possible to measure the molecular weight of the polyamine compound using a boiling point increasing method or a viscosity method.

In the present embodiment, from the viewpoint of efficiently forming a cross-linked body with an excellent gas barrier property after a retort treatment in a short time, the combination of the polycarboxylic acid and polyamine compound is preferably polyacrylic acid and branched polyamine, and even more preferably polyacrylic acid and branched polyethyleneimine.

In addition, from the same viewpoint, the weight average molecular weight of the polyacrylic acid in the combination of polyacrylic acid and branched polyethyleneimine is $5 \times 10^4$ or more, more preferably $1.5 \times 10^3$ or more, even more preferably $2 \times 10^3$ or more, and yet more preferably $5 \times 10^3$ or more, and, in addition, preferably $2 \times 10^6$ or less, more preferably $1.5 \times 10^6$ or less, and even more preferably $1.3 \times 10^6$ or less.

In addition, from the same viewpoint, the weight average molecular weight of the branched polyethyleneimine in the combination of polyacrylic acid and branched polyethyleneimine is preferably $2 \times 10^3$ or more, and more preferably $5 \times 10^3$ or more, and, in addition, preferably $1 \times 10^5$ or less, more preferably $8 \times 10^4$ or less, and even more preferably $5 \times 10^4$ or less.

In addition, from the viewpoint of efficiently forming a cross-linked body with an excellent gas barrier property after a retort treatment in a short time, the molar ratio of $((NH_2+NH)/COOH))$ is preferably 0.28 or more, more preferably 0.30 or more, and even more preferably 0.31 or more.

In addition, from the same viewpoint, the molar ratio $((NH_2+NH)/COOH)$ is preferably 0.5 or less, more preferably 0.48 or less, even more preferably 0.46 or less, and yet more preferably 0.42 or less.

It is possible to obtain the mixture including the polycarboxylic acid and the polyamine compound, for example, in the following manner.

First, the carboxy groups of the polycarboxylic acid are completely or partially neutralized by adding a base to the polycarboxylic acid. Next, the polyamine compound is added to the polycarboxylic acid in which the carboxy groups are completely or partially neutralized. Mixing the polycarboxylic acid and the polyamine compound according to such a procedure makes it possible to suppress the generation of aggregates of the polycarboxylic acid and the polyamine compound and to obtain a uniform mixture. This makes it possible to more effectively advance the dehydration-condensation reaction between the —COOH— group included in the polycarboxylic acid and the amino group included in the polyamine compound.

Here, it is possible to suppress gelation from occurring by neutralizing the polycarboxylic acid with the base when mixing a polyamine compound and polycarboxylic acid. Accordingly, in the polycarboxylic acid, from the viewpoint of prevention of gelation, it is preferable that the carboxy group is partially or completely neutralized by a base. It is possible to obtain the neutralized product by partially or completely neutralizing the carboxy group of polycarboxylic acid with a base, that is, the carboxy group of the polycarboxylic acid is partially or completely made into carboxylate. In addition, as necessary, abase in excess of complete neutralization may be added. Due to this, it is possible to prevent gelation when adding a polyamine compound. In particular, in a case where high molecular weight polycarboxylic acids are used, the addition of a base in excess of complete neutralization is useful for preventing gelation.

A neutralized product of polycarboxylic acid is prepared by adding a base to an aqueous solution of polycarboxylic acid and it is possible to set a desired neutralization degree by adjusting the ratio of the amounts of the polycarboxylic acid and the base. In the present embodiment, from the viewpoint of sufficiently suppressing gelation caused by the neutralization reaction with an amino group of a polyamine compound, the neutralization degree of the polycarboxylic acid by the base is preferably 30 to 400 equivalent %, more preferably 40 to 300 equivalent %, and even more preferably 50 to 250 equivalent %.

It is possible to use an arbitrary water-soluble base as a base. It is possible to use either or both of a volatile base and a non-volatile base as a water-soluble base; however, a volatile base which is easily removed when drying or curing is preferable from the viewpoint of suppressing a deterioration in the gas barrier property due to a residual free base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining a favorable gas barrier property, an ammonia aqueous solution is preferable.

Examples of non-volatile bases include sodium hydroxide, lithium hydroxide, and potassium hydroxide, an aqueous solution thereof, or a mixture thereof.

In addition, from the viewpoint of improving coatability when the mixture is coated, the solid content concentration in the mixture is preferably set to 0.5 to 15% by mass, and more preferably 1 to 10% by mass.

In addition, for the mixture, it is preferable to further add a surfactant from the viewpoint of preventing the occurrence of cissing when coating the mixture on a base material. The addition amount of the surfactant is preferably 0.01 to 3% by mass, and more preferably 0.01 to 1% by mass, based on 100% by mass of the total solid content of the mixture.

In the present embodiment, examples of the surfactant include an anionic surfactant, a non-ionic surfactant, a cationic surfactant, an amphoteric surfactant and the like, and, from the viewpoint of obtaining favorable coatability, non-ionic surfactants are preferable, and polyoxyethylene alkyl ethers are more preferable.

Examples of the non-ionic surfactants include polyoxyalkylene alkyl aryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkyl aryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyne-3ol, and the like.

Examples of fluorine-containing surfactants include fluorine alkyl ester and the like.

In addition, the mixture may also include other additives in a range in which the purpose of the present invention is not impaired.

For example, various additives such as lubricants, slip agents, anti-blocking agents, antistatic agents, anti-fogging agents, pigments, dyes, inorganic or organic fillers, and polyvalent metal compounds may be added.

It is possible to use the obtained mixture, for example, as a gas barrier coating material. Specifically, it is possible to obtain a coating layer by coating the gas barrier coating material on abase material at a predetermined thickness.

The mixture coating method is not limited and it is possible to use ordinary methods. Examples thereof include methods for coating using various known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, die coaters, and applicators.

From the viewpoint of making the barrier performance of the obtained gas barrier polymer more favorable, the thickness (wet thickness) of the coating layer is preferably 0.05 µm or more, and more preferably 1 µm or more.

In addition, from the viewpoint of suppressing curling of the obtained gas barrier polymer and from the viewpoint of more effectively advancing the dehydration-condensation reaction between the —COOH group included in the polycarboxylic acid and the amino group included in the polyamine compound, the wet thickness is preferably 300 µm or less, more preferably 200 µm or less, even more preferably 100 µm or less, and yet more preferably 30 µm or less.

Next, a description will be given of the method for heat-curing the mixture. Specifically, by heating the coating layer described above, the carboxyl group included in the polycarboxylic acid and the amino group included in the polyamine compound undergo a dehydration-condensation reaction to obtain a gas barrier polymer having an amide bond as a cured product. In the present embodiment, by heat-curing in a short time, amide cross-linking points are formed in the cross-linked body in a preferable distribution state making it possible to obtain a cross-linked body with an excellent gas barrier property after a retort treatment.

The method, temperature, and time of the heat treatment in the heat-curing are set such that the amide cross-linking points are formed in a preferable distribution state in the cross-linked body by heat-curing in a short time.

The method of the heat treatment is selected according to the viewpoints described above and, for example, any method capable of curing the mixture and heating the cured gas barrier coating material may be used. Specific examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of manufacturing efficiency. In particular, from the viewpoint of being usable for drying, heating, annealing and the like, it is preferable to use a hot air oven, and from the viewpoint of excellent thermal conductivity efficiency to the film, it is preferable to use a heating roll. Further, methods used for the drying and heat treatments may be appropriately combined. A hot air oven and a heating roll may be used in combination, for example, if the mixture is dried in a hot air oven and then subjected to a heat treatment with a heating roll, the heat treatment step duration becomes short, which is preferable from the viewpoint of manufacturing efficiency. In addition, it is preferable to perform the drying and heat treatment only with a hot air oven. In the case of drying the mixture using a hot air oven, it is desirable to perform heat treatment under conditions where the heat treatment temperature is 160° C. to 250° C. and the heat treatment time is 1 second to 10 minutes, preferably where the heat treatment temperature is 180° C. to 240° C. and the heat treatment time is 2 seconds to 8 minutes, more preferably where the heat treatment temperature is 200° C. to 230° C. and the heat treatment time is 2 seconds to 6 minutes, and even more preferably where the heat treatment temperature is 200° C. to 220° C. and the heat treatment time is 3 seconds to 5 minutes. Furthermore, as described above, it is possible to perform the heat treatment in a short time by using a heating roll therewith. Note that, from the viewpoint of effectively advancing the dehydration-condensation reaction between the —COOH— group included in the polycarboxylic acid and the amino group included in the polyamine compound, it is important to adjust the heat treatment temperature and the heat treatment time according to the wet thickness of the mixture.

From the viewpoint of improving the gas barrier property after a retort treatment, the thickness of the coating layer after drying and curing is preferably 0.01 μm or more, more preferably 0.05 μm or more, and even more preferably 0.1 μm or more. In addition, from the viewpoint of improving the productivity of the gas barrier polymer, the thickness described above is preferably 15 μm or less, more preferably 5 μm or less, and even more preferably 1 μm or less. In addition, the thickness described above is specifically the thickness of the gas barrier layer in the gas barrier laminate described below.

Regarding the drying and heat treatment, the heat treatment may be carried out after drying, or the drying and heat treatment may be carried out at the same time. The methods for the drying and heat treatment are not limited as long as the methods are capable of achieving the purpose of the present invention, but, from the viewpoint of being able to be used for various purposes such as drying, heating, and annealing, a method using an oven is preferable, and a method using a heating roll is even more preferable from the viewpoint that the excellent heat conductivity efficiency to the film for heating purposes is excellent.

In the manufacturing method described above, for the first time, it is possible to obtain the gas barrier polymer in the present embodiment by controlling to a high level the type of polycarboxylic acid blended in the mixture, the structure and molecular weight of the polyamine compound blended in the mixture, and the molar ratio of $((NH_2+NH)/COOH)$ in the mixture and appropriately controlling the manufacturing conditions such as the method, temperature, and time of the heat treatment.

The gas barrier polymer obtained in the present embodiment has excellent productivity as well as an excellent gas barrier property after a retort treatment. More specifically, with the present embodiment, it is possible to obtain a gas barrier polymer having an excellent oxygen gas barrier property after a retort treatment with a short heat treatment.

The gas barrier polymer obtained in the present embodiment may be used alone, but from the viewpoint of strength improvement, use in combination with other materials is preferable, for example, use is possible as a gas barrier laminate. It is possible to obtain the above, for example, according to the method for manufacturing a gas barrier polymer described above.

Specific examples of gas barrier laminates are shown below.

(Gas Barrier Laminate)

Figure 2:
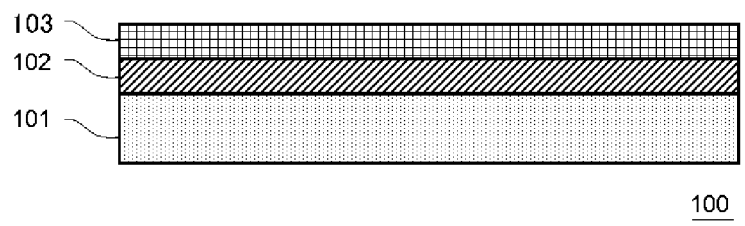
FIG. 2 is a cross-sectional view schematically showing a configuration of a gas barrier laminate in an embodiment.

FIG. 1 and FIG. 2 are cross-sectional views schematically showing an example of a structure of a gas barrier laminate 100 of the present embodiment.

The gas barrier laminate 100 is provided with a base material layer 101, and a gas barrier layer 103 provided on at least one surface of the base material layer 101 and including the gas barrier polymer in the present embodiment.

In addition, as shown in FIG. 2, in the gas barrier laminate 100, an inorganic material layer 102 may be further laminated between the base material layer 101 and the gas barrier layer 103. Due to this, it is possible to further improve the barrier performances such as the oxygen barrier property and water vapor barrier property.

In addition, in the gas barrier laminate 100, an undercoat layer may be further laminated on the base material layer 101 from the viewpoint of improving adhesion between the base material layer 101 and the gas barrier layer 103 or the inorganic material layer 102.

A more detailed description will be given below of the composition of each layer.

(Gas Barrier Layer)

The gas barrier layer 103 is provided on at least one surface of the base material layer 101 and includes the gas barrier polymer in the present embodiment described above.

Specifically, the gas barrier layer 103 is formed by a gas barrier coating material formed of the mixture described above and is obtained by coating the gas barrier coating material on the base material layer 101 and the inorganic material layer 102, then performing drying and a heat treatment to cure the gas barrier coating material.

From the viewpoint of obtaining good gas barrier properties, the degree of oxygen permeability of the gas barrier layer 103 at a thickness of 1 μm at 20° C. and 90% RH is preferably 40 mL/(m$^2$-day-MPa) or less, more preferably 30 mL/(m$^2$-day-MPa) or less, and even more preferably 20 mL/(m$^2$-day-MPa) or less.

The degree of oxygen permeability is measured in accordance with JISK7126 under conditions of a temperature of 20° C. and a humidity of 90% RH.

(Base Material Layer)

The base material layer 101 is formed, for example, of an organic material such as a thermosetting resin, a thermoplastic resin, or paper and preferably includes at least one selected from a thermosetting resin and a thermoplastic resin.

Examples of the thermosetting resin include known thermosetting resins, for example, epoxy resins, unsaturated polyester resins, phenolic resins, urea-melamine resins, polyurethane resins, silicone resins, and polyimides.

Examples of thermoplastic resins include known thermoplastic resins, for example, polyolefins (polyethylene, polypropylene, poly(4-methyl-1-pentene), poly(l-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among the above, from the viewpoint of favorable transparency, one or two or more selected from polypropylene, polyethylene terephthalate, polybutylene terephthalate, polyethylene naphthalate, polyamide, and polyimide is preferable, and one or two or more selected from polyethylene terephthalate and polyethylene naphthalate is more preferable.

In addition, the base material layer 101 formed by the thermoplastic resin may be a single layer or two or more layers, depending on the application of the gas barrier laminate 100.

In addition, the film formed by the above thermosetting resin and thermoplastic resin may be stretched in at least one direction, preferably in a biaxial direction, to form the base material layer 101.

From the viewpoint of excellent transparency, rigidity, and heat resistance, the base material layer 101 of the present embodiment is preferably a biaxial stretched film formed by one or two or more thermoplastic resins selected from polypropylene, polyethylene terephthalate, polybutylene terephthalate, polyethylene naphthalate, polyamide, polyimide, and more preferably a biaxial stretched film formed by one or two or more thermoplastic resins selected from polyethylene terephthalate and polyethylene naphthalate.

In addition, the surface of the base material layer 101 may be coated with polyvinylidene chloride, polyvinyl alcohol, ethylene/vinyl alcohol copolymer, acrylic resin, urethane-based resin, or the like.

Furthermore, the base material layer 101 may be subjected to a surface treatment in order to improve the adhesion with the gas barrier layer 103. Specifically, a surface activation treatment such as a corona treatment, a flame treatment, a plasma treatment, or a primer coat treatment may be performed.

From the viewpoint of obtaining good film properties, the thickness of the base material layer 101 is preferably 1 to 1000 μm, 1 to 500 μm is more preferable, and 1 to 300 μm is even more preferable.

The shape of the base material layer 101 is not limited and examples thereof include a sheet or film shape, a tray, a cup, a hollow body, or the like.

(Inorganic Material Layer)

Examples of the inorganic material forming the inorganic material layer 102 include metals, metal oxides, metal nitrides, metal fluorides, metal oxynitrides, and the like which are able to form a thin film having barrier properties.

Examples of inorganic materials forming the inorganic material layer 102 include one type or two or more types selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides fluorides, oxynitrides, and the like thereof.

Note that, in the present embodiment, the group name of the periodic table is indicated by the old CAS formula.

Furthermore, among the inorganic materials described above, one type or two or more types of inorganic materials selected from the group consisting of silicon oxide, aluminum oxide, and aluminum is preferable, due to being excellent in the balance of barrier properties, cost, and the like.

Note that, silicon oxide may contain silicon monoxide and silicon suboxide in addition to silicon dioxide.

The inorganic material layer 102 is formed of the inorganic material described above. The inorganic material layer 102 may be formed of a single inorganic material layer or a plurality of inorganic material layers. In addition, in a case where the inorganic material layer 102 is formed of a plurality of inorganic material layers, the inorganic material layer 102 may be formed of the same type of inorganic material layer or may be formed of different types of inorganic material layers.

The thickness of the inorganic material layer 102 is usually equal to or more than 1 nm and equal to or less than 1000 nm, and preferably equal to or more than 1 nm and equal to or less than 500 nm, from the viewpoint of balance between the barrier property, adhesion, handleability, and the like.

In the present embodiment, it is possible to determine the thickness of the inorganic material layer 102 from observation images taken by a transmission electron microscope or a scanning electron microscope.

The method of forming the inorganic material layer 102 is not limited and it is possible to form the inorganic material layer 102 on one side or both sides of the base material layer 101 using, for example, a vacuum deposition method, an ion plating method, a sputtering method, a chemical vapor deposition method, a physical vapor deposition method, a chemical vapor deposition (CVD) method, a plasma CVD method, a sol-gel method, or the like. Among the above, film formation under reduced pressure such as a sputtering method, an ion plating method, a CVD method, a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 102 and to reduce the number of pores.

In order to rapidly perform these bonding reactions, it is desirable that the inorganic atoms and compounds are chemically active molecular species or atomic species.

(Undercoat Layer)

In the gas barrier laminate 100, from the viewpoint of improving the adhesion between the base material layer 101 and the gas barrier layer 103 or the inorganic material layer 102, an undercoat layer, preferably an undercoat layer of an epoxy (meth)acrylate-based compound or a urethane (meth)acrylate-based compound, is preferably formed on the surface of the base material layer 101.

The undercoat layer is preferably a layer obtained by curing at least one type selected from an epoxy (meth)acrylate-based compound and a urethane (meth)acrylate-based compound.

Examples of the epoxy (meth)acrylate-based compound include compounds obtained by reacting epoxy compounds such as bisphenol A type epoxy compounds, bisphenol F type epoxy compounds, bisphenol S type epoxy compounds, phenol novolak type epoxy compounds, cresol novolak type epoxy compounds, and aliphatic epoxy compounds, with acrylic acid or methacrylic acid, and examples thereof include an acid-modified epoxy (meth)acrylate obtained by reacting the epoxy compound above with a carboxylic acid or an anhydride thereof. These epoxy (meth)acrylate-based compounds are coated on the surface of the base material layer 101 together with a photopolymerization initiator and, if necessary, another photopolymerization initiator or a diluent formed of a thermally reactive monomer, after which an undercoat layer is formed by a cross-linking reaction through irradiation with ultraviolet light or the like.

Examples of the urethane (meth)acrylate-based compound include compounds obtained by acrylating an oligomer (also referred to below as a polyurethane-based oligomer) formed of a polyol compound and a polyisocyanate compound, and the like.

It is possible to obtain the polyurethane-based oligomer from a condensation product of a polyisocyanate compound and a polyol compound. Specific examples of the polyisocyanate compound include methylene•bis (p-phenylene diisocyanate), an adduct of hexamethylene diisocyanate•hexanetriol, hexamethylene diisocyanate, tolylene diisocyanate, an adduct of tolylene diisocyanate trimethylolpropane, 1,5-naphthylene diisocyanate, thiopropyl diisocyanate, ethylbenzene-2,4-diisocyanate, 2,4-tolylene diisocyanate dimer, hydrogenated xylylene diisocyanate, tris (4-phenylisocyanate) thiophosphate, and the like, in addition, specific polyol compounds include polyether-based polyols such as polyoxytetramethylene glycol, polyester-based polyols such as polyadipate polyols and polycarbonate polyol, copolymers of acrylate esters and hydroxyethyl methacrylate, and the like. Examples of the monomer forming the acrylate include monomers such as methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and the like.

These epoxy(meth)acrylate-based compounds and urethane (meth)acrylate-based compounds are used in combination, if necessary. In addition, examples of methods of polymerizing the above include various known methods, specifically, methods of irradiation with energy rays including ionizing radiation, heating, or the like.

In the case where the undercoat layer is formed by curing with ultraviolet rays, acetophenones, benzophenones, Michler's benzoyl benzoate, α-amyloxime ester, thioxanthones, or the like are preferably used as a photopolymerization initiator and, in addition, n-butylamine, triethylamine, tri n-butylphosphine, and the like are preferably mixed and used as a photosensitizer. In addition, in the present embodiment, an epoxy (meth)acrylate-based compound and a urethane (meth)acrylate-based compound may also be used in combination.

In addition, these epoxy(meth)acrylate-based compounds and urethane (meth)acrylate-based compounds are diluted with (meth)acrylic-based monomers. Examples of such (meth)acrylic-based monomers include methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and, as multi-functional monomers, trimethylolpropane tri(meth)acrylate, hexanediol (meth)acrylate, tripropylene glycol di(meth)acrylate, diethylene glycol di(meth)acrylate, pentaerythritol tri (meth)acrylate, dipentaerythritol hexa(meth)acrylate, 1,6-hexanediol di(meth)acrylate, neopentyl glycol di(meth)acrylate, and the like.

Among the above, in a case where the urethane (meth)acrylate-based compound is used as the undercoat layer, the oxygen gas barrier property of the obtained gas barrier laminate 100 is further improved.

The thickness of the undercoat layer of the present embodiment is usually in the range of 0.01 to 100 $g/m^2$, preferably 0.05 to 50 $g/m^2$, as the coating amount.

Further, an adhesive layer may be provided between the base material layer 101 and the gas barrier layer 103. Note that, the undercoat layer is excluded from the adhesive layer.

The adhesive layer is a layer including any known adhesive agent. Examples of the adhesive agent include laminated adhesive agents formed of an organic titanium-based resin, a polyethylene imine-based resin, a urethane-based resin, an epoxy-based resin, an acrylic-based resin, a polyester-based resin, an oxazoline group containing resin, a modified silicone resin, an alkyl titanate, a polyester-based polybutadiene, and the like, or a one-component type or two-component type polyols and polyvalent isocyanates, aqueous urethane, ionomers, and the like. Alternatively, an aqueous adhesive agent mainly composed of an acrylic-based resin, a vinyl acetate-based resin, a urethane-based resin, a polyester resin, or the like may be used.

In addition, other additives such as a curing agent and a silane coupling agent may be added to the adhesive agent depending on the application of the gas barrier laminate 100. In a case where the gas barrier laminate 100 is used for hot water treatment such as retorting, from the viewpoint of heat resistance and water resistance, a dry lamination adhesive agent represented by a polyurethane-based adhesive agent is preferable, and a solvent-based two-component curing type polyurethane-based adhesive agent is more preferable.

The gas barrier laminate 100 of the present embodiment has excellent gas barrier properties and is able to be suitably used as a packaging material, in particular, as a food packaging material for contents requiring a high gas barrier performance, as well as various other packaging materials such as medical applications, industrial applications, and miscellaneous day to day applications.

In addition, the gas barrier laminate 100 of the present embodiment is able to be suitably used, for example, as a film for vacuum insulation; a sealing film for sealing electroluminescence devices, solar cells, or the like, for which a high barrier performance is required.

Although the embodiments of the present invention were described with reference to the drawings, these are examples of the present invention and it is also possible to adopt various configurations other than those described above.

EXAMPLES

The present embodiment will be described in detail below with reference to Experimental Examples. The present embodiment is not limited at all to the descriptions in these Experimental Examples.

First, a description will be given of the samples of polycarboxylic acid and polyamine used in each Example.

(Preparation of Solution (Z1)): 100000 PAA

A 10% solution of ammonium polyacrylate aqueous solution was obtained by adding purified water to a mixture of ammonium polyacrylate (manufactured by TOAGOSEI Co., Ltd., trade name: Aron A-30, 30% aqueous solution, weight average molecular weight: $1 \times 10^3$).

(Preparation of Solution (Z2)): 800000 PAA

A 10% solution of polyacrylic acid aqueous solution was obtained by adding purified water to polyacrylic acid (manufactured by TOAGOSEI Co., Ltd., trade name: JurymerAC-10H, 20% aqueous solution, weight average molecular weight: $8\times10^3$).

(Preparation of Solution (Y1)): B-PEI1800

A 10% solution of branched polyethyleneimine aqueous solution Y1 was obtained by adding purified water to a branched polyethyleneimine (manufactured by Nippon Shokubai Co., Ltd., trade name: Epomin SP-018, number average molecular weight: $1.8\times10^3$). The amine ratio of the branched polyethyleneimine used in the blending calculation was set as primary:secondary:tertiary=1.0:1.0:0.9.

(Preparation of Solution (Y2)): B-PEI5000

A 10% solution of a branched polyethyleneimine aqueous solution Y2 was obtained by adding purified water to branched polyethyleneimine (manufactured by BASF, trade name: Lupasol G 100, 50% aqueous solution, weight average molecular weight: $5\times10^3$). The amine ratio of the branched polyethyleneimine used in the blending calculation was set as primary:secondary:tertiary=1.0:1.0:0.7.

(Preparation of Solution (Y3)): B-PEI10000

A 10% solution of a branched polyethyleneimine aqueous solution Y3 was obtained by adding purified water to branched polyethyleneimine (manufactured by Nippon Shokubai Co., Ltd., trade name: Epomin SP-200, number average molecular weight: $1\times10^4$). The amine ratio of the branched polyethyleneimine used in the blending calculation was set as primary:secondary:tertiary=1.0:1.0:0.9.

(Preparation of Solution (Y4)): B-PEI25000

A 10% solution of a branched polyethyleneimine aqueous solution Y4 was obtained by adding purified water to branched polyethyleneimine (manufactured by BASF, trade name: Lupasol WF, weight average molecular weight: $2.5\times10^4$). The amine ratio of the branched polyethyleneimine used in the blending calculation was set as primary:secondary:tertiary=1.0:1.0:0.7.

(Preparation of Solution (Y5)): B-PEI30000

A 10% solution of a branched polyethyleneimine aqueous solution Y5 was obtained by adding purified water to branched polyethyleneimine (manufactured by Nippon Shokubai Co., Ltd., trade name: Epomin HM-2000, moisture content approximately 7%, number average molecular weight: $3\times10^4$). The amine ratio of the branched polyethyleneimine used in the blending calculation was set as primary:secondary:tertiary=1.0:1.0:0.9.

(Preparation of Solution (Y6)): B-PEI70000

A 10% solution of a branched polyethyleneimine aqueous solution Y6 was obtained by adding purified water to branched polyethyleneimine (manufactured by Nippon Shokubai Co., Ltd., trade name: Epomin P-1000, number average molecular weight: $7\times10^4$). The amine ratio of the branched polyethyleneimine used in the blending calculation was set as primary:secondary:tertiary=1.0:2.0:1.0.

(Preparation of Solid Sample (Y7)): L-PEI25000

As linear polyethyleneimine (L-PEI), a solid sample (Y7), weight average molecular weight: $2.5\times10^4$, manufactured by Alfa Aesar was used.

(Preparation of Solution (Y8)): L-PAAm25000

Using a linear polyarylamine (L-PAAm) (manufactured by Nittobo Medical Co., Ltd., trade name: PAA-25, 10% aqueous solution, weight average molecular weight: $2.5\times10^4$) as is without dilution, a linear polyarylamine aqueous solution Y8 was obtained. The amine ratio of the linear polyarylamine used in the blending calculation was set as primary:secondary:tertiary=1.0:0:0.

(Preparation of Solution (Y9)): L-PVAm60000

From linear polyvinylamine (L-PVAm) (manufactured by Mitsubishi Chemical Corporation, trade name: PVAM-0595B, 12% aqueous solution, weight average molecular weight: $6\times10^4$), sodium formate included as a sub-component was removed, with reference to the example in Japanese Unexamined Patent Publication No. 2000-239634. Specifically, methanol and isopropyl alcohol were added to PVAM-0595B, and filtering, concentration, and standing were repeated twice to obtain a 10% linear polyvinylamine solution Y9. The amine ratio of the linear polyarylamine used in the blending calculation was set as primary:secondary:tertiary=1.0:0:0.

Next, a method for preparing a coating solution used to prepare the gas barrier layer will be described. Table 1 shows combinations of polycarboxylic acid and polyamine compounds in the coating solutions used in the following examples.

TABLE 1

| Polycarboxylic acid | Polyamine compound | Solution Z (PAA) | Solution or solid sample Y (polyamine) | $(NH_2 + NH)/COOH$ | Coating solution |
|---|---|---|---|---|---|
| PAA 100000 | B-PEI1800 | Z1 | Y1 | 0.315 | X1-1 |
| PAA 100000 | B-PEI5000 | Z1 | Y2 | 0.315 | X2-1 |
|  |  | Z1 | Y2 | 0.385 | X2-2 |
|  |  | Z1 | Y2 | 0.455 | X2-3 |
| PAA 100000 | B-PEI10000 | Z1 | Y3 | 0.315 | X3-1 |
|  |  | Z1 | Y3 | 0.385 | X3-2 |
|  |  | Z1 | Y3 | 0.455 | X3-3 |
| PAA 100000 | B-PEI25000 | Z1 | Y4 | 0.315 | X4-1 |
|  |  | Z1 | Y4 | 0.385 | X4-2 |
|  |  | Z1 | Y4 | 0.455 | X4-3 |
| PAA 100000 | B-PEI30000 | Z1 | Y5 | 0.315 | X5-1 |
|  |  | Z1 | Y5 | 0.385 | X5-2 |
|  |  | Z1 | Y5 | 0.455 | X5-3 |
| PAA 100000 | B-PEI70000 | Z1 | Y6 | 0.315 | X6-1 |
|  |  | Z1 | Y6 | 0.385 | X6-2 |
|  |  | Z1 | Y6 | 0.455 | X6-3 |
| PAA 100000 | L-PEI25000 | Z1 | Y7 | 0.315 | X7-1 |
|  |  | Z1 | Y7 | 0.385 | X7-2 |
|  |  | Z1 | Y7 | 0.455 | X7-3 |
| PAA 100000 | L-PAAm25000 | Z1 | Y8 | 0.315 | X8-1 |
|  |  | Z1 | Y8 | 0.385 | X8-2 |
|  |  | Z1 | Y8 | 0.455 | X8-3 |

TABLE 1-continued

| Polycarboxylic acid | Polyamine compound | Solution Z (PAA) | Solution or solid sample Y (polyamine) | (NH$_2$ + NH)/ COOH | Coating solution |
|---|---|---|---|---|---|
| PAA 100000 | L-PVAm60000 | Z1 | Y9 | 0.315 | X9-1 |
|  |  | Z1 | Y9 | 0.385 | X9-2 |
|  |  | Z1 | Y9 | 0.455 | X9-3 |
| PAA 800000 | B-PEI1800 | Z2 | Y1 | 0.315 | V1-1 |
|  |  | Z2 | Y1 | 0.385 | V1-2 |
|  |  | Z2 | Y1 | 0.455 | V1-3 |
| PAA 800000 | B-PEI5000 | Z2 | Y2 | 0.315 | V2-1 |
|  |  | Z2 | Y2 | 0.385 | V2-2 |
|  |  | Z2 | Y2 | 0.455 | V2-3 |
| PAA 800000 | B-PEI10000 | Z2 | Y3 | 0.315 | V3-1 |
|  |  | Z2 | Y3 | 0.385 | V3-2 |
|  |  | Z2 | Y3 | 0.455 | V3-3 |
| PAA 800000 | B-PEI25000 | Z2 | Y4 | 0.315 | V4-1 |
|  |  | Z2 | Y4 | 0.385 | V4-2 |
|  |  | Z2 | Y4 | 0.455 | V4-3 |

(Preparation of Coating Solution (X1))

Solution (Y1) was added to solution (Z1) such that ((NH$_2$+NH)/COOH) was 0.385 and stirred to obtain a transparent, uniform mixed solution.

Furthermore, purified water was added such that the solid content concentration of the mixed solution described above became 2.5% by mass and stirred until the solution became uniform and then a non-ionic surfactant (polyoxyethylene lauryl ether, manufactured by Kao Corporation, trade name: EMULGEN 120) was mixed therein so as to be 0.3% by mass with respect to the solid content of the mixed solution to prepare a coating solution (X1-2).

(Preparation of Coating Solutions (X2))

Solution (Y2) was added to solution (Z1) such that ((NH$_2$+NH)/COOH) was 0.315, 0.385, and 0.455, respectively, and stirred to obtain a transparent, uniformmixed solution. Furthermore, purified water was added such that the solid content concentration of the mixed solution described above became 2.5% by mass and stirred until the solution became uniform and then a non-ionic surfactant (polyoxyethylene lauryl ether, manufactured by Kao Corporation, trade name: EMULGEN 120) was mixed therein so as to be 0.3% by mass with respect to the solid content of the mixed solution to prepare coating solutions (X2-1 to X2-3).

(Preparation of Coating Solutions (X3))

Coating solutions (X3-1 to X3-3) were prepared in the same manner as for coating solution (X2), except that solution (Y2) was switched to solution (Y3).

(Preparation of Coating Solutions (X4))

Coating solutions (X4-1 to X4-3) were prepared in the same manner as for coating solution (X2), except that solution (Y2) was switched to solution (Y4).

(Preparation of Coating Solutions (X5))

Coating solutions (X5-1 to X5-3) were prepared in the same manner as for coating solution (X2), except that solution (Y2) was switched to solution (Y5).

(Preparation of Coating Solutions (X6))

Coating solutions (X6-2, X6-3) were prepared in the same manner as for coating solution (X2), except that solution (Y2) was switched to solution (Y6) and ((NH$_2$+NH)/COOH) was set to 0.385 and 0.455, respectively.

(Preparation of Coating Solutions (X7))

A solid sample (Y7) and purified water were added to solution (Z1) such that ((NH$_2$+NH)/COOH) was 0.315, 0.385, and 0.455, respectively, and stirred while heating at 50° C. to obtain a transparent, uniform mixed solution with a solid content concentration of 10%. The amine ratio of linear polyethyleneimine used in the blending calculation of the mixture was set to be primary:secondary:tertiary=0:1.0:0. Furthermore, purified water was added such that the solid content concentration of the mixed solution described above became 2.5% by mass and stirred until the solution became uniform and then a non-ionic surfactant (polyoxyethylene lauryl ether, manufactured by Kao Corporation, trade name: EMULGEN 120) was mixed therein so as to be 0.3% by mass with respect to the solid content concentration of the mixed solution to prepare coating solutions (X7-1 to X7-3).

(Preparation of Coating Solutions (X8))

Solution (Y8) was added to solution (Z1) such that ((NH$_2$+NH)/COOH) was 0.315, 0.385, and 0.455, respectively, and an excess of 7 equivalents of ammonia water to the number of moles of carboxylic acid of solution (Z1) was added thereto and stirred to obtain a transparent, uniform mixed solution. Furthermore, purified water was added such that the solid content concentration of the mixed solution described above became 2.5% by mass and stirred until the solution became uniform and then a non-ionic surfactant (polyoxyethylene lauryl ether, manufactured by Kao Corporation, trade name: EMULGEN 120) was mixed therein so as to be 0.3% by mass with respect to the solid content of the mixed solution to prepare coating solutions (X8-1 to X8-3).

(Preparation of Coating Solutions (X9))

Coating solutions (X9-1 to X9-3) were prepared in the same manner as for coating solution (X8), except that solution (Y8) was switched to solution (Y9) and to be 3 equivalents with respect to the number of moles of carboxylic acid.

(Preparation of Coating Solutions (V1))

Ammonia water, which was 1.5 equivalents with respect to the number of moles of carboxylic acid in solution (Z2), that is, 0.5 equivalents in excess of complete neutralization, was added thereto and stirred and mixed. Solution (Y1) was added thereto such that ((NH$_2$+NH)/COOH) was 0.315, 0.385, and 0.455, respectively, and stirred to obtain a transparent, uniformmixed solution. Furthermore, purified water was added such that the solid content concentration of the mixed solution described above became 2.5% by mass and stirred until the solution became uniform and then a non-ionic surfactant (polyoxyethylene lauryl ether, manufactured by Kao Corporation, trade name: EMULGEN 120) was mixed therein so as to be 0.3% by mass with respect to the solid content of the mixed solution to prepare coating solutions (V1-1 to V1-3).

(Preparation of Coating Solutions (V2))

Coating solutions (V2-1 to V2-3) were prepared in the same manner as for coating solution (V1), except that solution (Y1) was switched to solution (Y2).

(Preparation of Coating Solutions (V3))

Coating solutions (V3-1 to V3-3) were prepared in the same manner as for coating solution (V1), except that solution (Y1) was switched to solution (Y3).

(Preparation of Solutions (V4))

Coating solutions (V4-1 to V4-3) were prepared in the same manner as for coating solution (V1), except that solution (Y1) was switched to solution (Y4).

Experimental Example 1

The obtained coating solutions (X1 to X9 and V1 to V4) were coated on a corona-treated surface of a 12 μm thick biaxial stretched polyethylene terephthalate film (manufactured by Unitika Ltd., trade name PET12) using a bar coater such that the coating amount after drying was 0.1 g/m² and dried in a hot air dryer at 120° C. for 5 min. Furthermore, the result was then heat-treated in a hot air dryer at 200° C. for a predetermined time to obtain a gas barrier laminate (also referred to below simply as "laminate") in which a gas barrier layer formed of a gas barrier polymer was formed on a PET base material, which was the base material layer.

The following evaluations were performed on the obtained laminates. The evaluation results are shown in Table 2 and Table 3. Table 2 and Table 3 show cases where polycarboxylic acids with weight average molecular weights of 100000 and 800000, respectively, were used.

(IR Measurement and Analysis Method)

For each of the obtained laminates, a sample of 1 cm×3 cm was cut out for measurement. Next, the infrared absorption spectrum of the surface of the gas barrier polymer layer side of the laminate was obtained by infrared total reflection measurement (ATR-IR method). The measurement was carried out at room temperature with a resolution of 2 cm$^{-1}$ and a number of integrations of 150 times using an FT/IR-460 apparatus manufactured by JASCO Corporation mounted with a multi-reflection measurement unit ATR PRO410-M (prism: Germanium crystal, angle of incidence 45 degrees, number of multiple reflections=5). A PET base material was also prepared as a measurement sample and the infrared absorption spectrum of the surface of the PET base material was measured in the same manner.

Since the infrared absorption spectrum of the obtained laminate includes the influence of the PET base material, the influence of the PET base material was removed by a general difference spectrum analysis method. Specifically, the method shown below was used.

For the infrared absorption spectra of the laminate and the PET base material, the measurement points at 1493 cm$^{-1}$ and the measurement points at 1780 cm$^{-1}$ were connected with a straight line (baseline: N) and the difference spectra between the infrared absorption spectra and N were obtained in the wavenumber range of 1493 cm$^{-1}$ to 1780 cm$^{-1}$ and set as spectrum ($S_{BN}$) and spectrum ($S_{SN}$), respectively. Furthermore, the measurement points at 1325 cm$^{-1}$ and the measurement points at 1355 cm$^{-1}$ of the infrared absorption spectra of the laminate and PET base material were connected with a straight line (baseline: M) and the difference spectra between the obtained infrared absorption spectra and M in the wavenumber range of 1325 cm$^{-1}$ to 1355 cm$^{-1}$ were obtained and set as spectrum ($S_{BM}$) and spectrum ($S_{SM}$), respectively. For the IR peak in the spectrum ($S_{BM}$), a wavenumber range was chosen such that the IR peak appeared under the influence of the PET base material only and set as a reference peak to exclude the influence of the PET base material in the spectrum ($S_{BN}$). For the spectrum ($S_{BM}$) and the spectrum ($S_{SM}$), the peak areas between 1325 cm$^{-1}$ and 1355 cm$^{-1}$ were set as area (ABM) and area (ASM), respectively, and a coefficient α was calculated from the following equation. The coefficient α is 0≤α<1.

$$\alpha = \text{Area}(A_{BM})/\text{Area}(A_{SM})$$

Using this coefficient α, a difference spectrum analysis according to the following equation was performed in the wavenumber range of 1493 cm$^{-1}$ to 1780 cm$^{-1}$ to obtain the spectrum ($S_{BN'}$) with the influence of the PET base material excluded.

$$<\text{Spectrum}(S_{BN'})>=\text{Spectrum}(S_{BN})>-\alpha^*<\text{Spectrum}(S_{SN})>.$$

The IR intensity at 1660 cm$^{-1}$ of the spectrum ($S_{BN'}$) obtained through the analysis described above was set as I(1660), the IR intensity at 1625 cm$^{-1}$ was set as I(1625), and the IR intensity ratio I(1660)/I(1625) was calculated.

In addition, in the spectrum ($S_{BN'}$), when the total peak area in the wavenumber range between 1493 cm$^{-1}$ and 1780 cm$^{-1}$ was set as A and the total peak area in the wavenumber range between 1598 cm$^{-1}$ and 1690 cm$^{-1}$ was set as B, the area ratio of the amide bonds was calculated as (B/A).

(Oxygen Permeability [mL/(m²·day·MPa)])

An ester-based adhesive agent (9 parts by mass of a polyurethane-based adhesive agent (manufactured by Mitsui Chemicals, Inc., trade name: Takelac A 525 S), 1 part by mass of an isocyanate-based curing agent (manufactured by Mitsui Chemicals, Inc., trade name: Takenate A50), and 7.5 parts by mass of ethyl acetate) was coated and dried on one side of an unstretched polypropylene film (manufactured by Mitsui Chemicals Tohcello, Inc., trade name: RXC-22) having a thickness of 70 μm and then bonded (dry lamination) with the barrier surface of the laminate obtained based on each blend to obtain a multilayer film.

The multilayer film obtained above was folded back such that the unstretched polypropylene film became the inner surface and the two sides were heat sealed to form a bag shape, then water was added thereto as the content and the other side was heat sealed to form a bag, which was subjected to a retort treatment under conditions of 130° C. for 30 minutes in a high temperature and high-pressure retort sterilizer. After the retort treatment, the water content was drained to obtain a multilayer film after the retort treatment.

Figure 3:
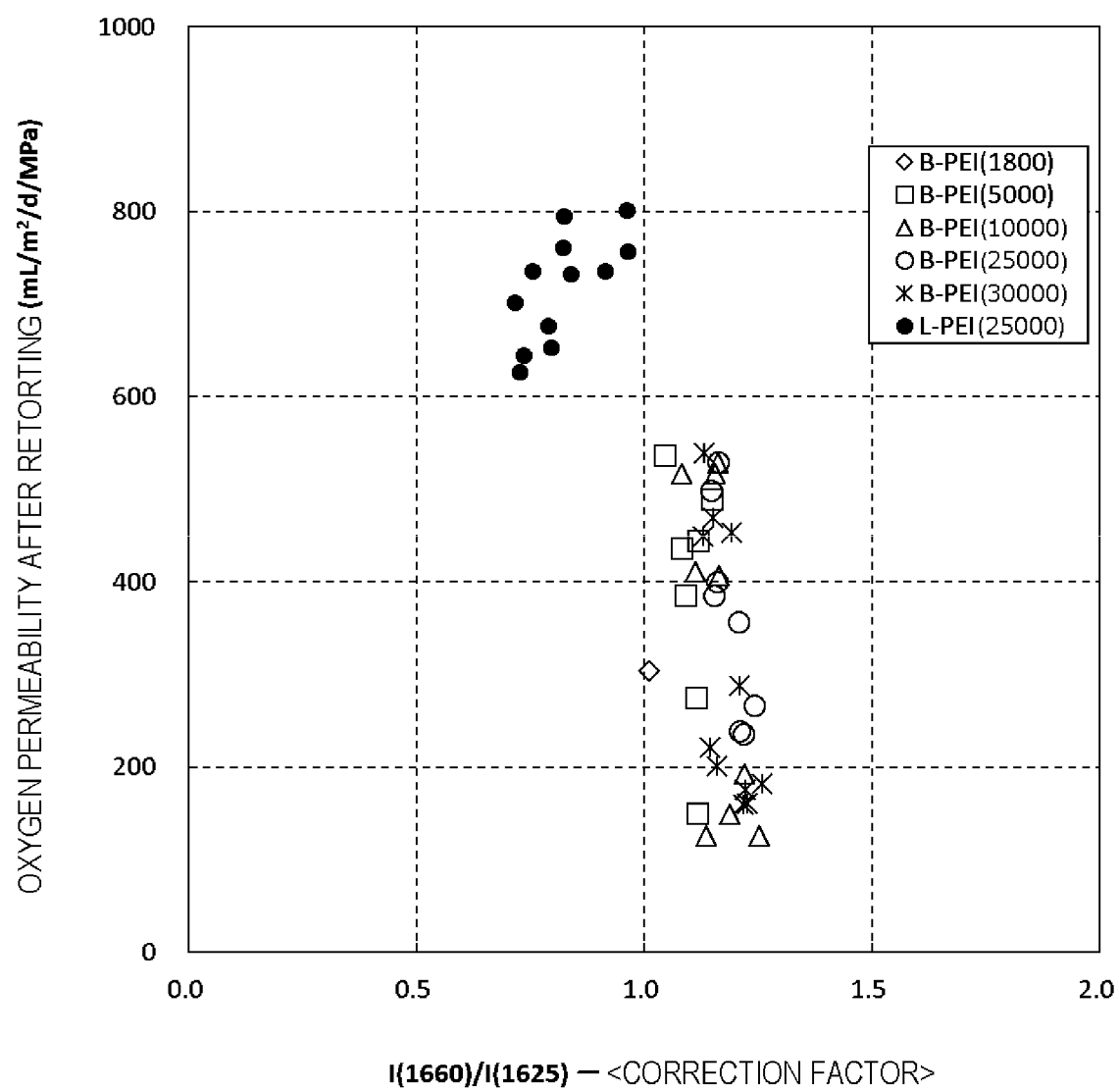
FIG. 3 is a diagram showing evaluation results of a gas barrier polymer in an Experimental Example.
Figure 4:
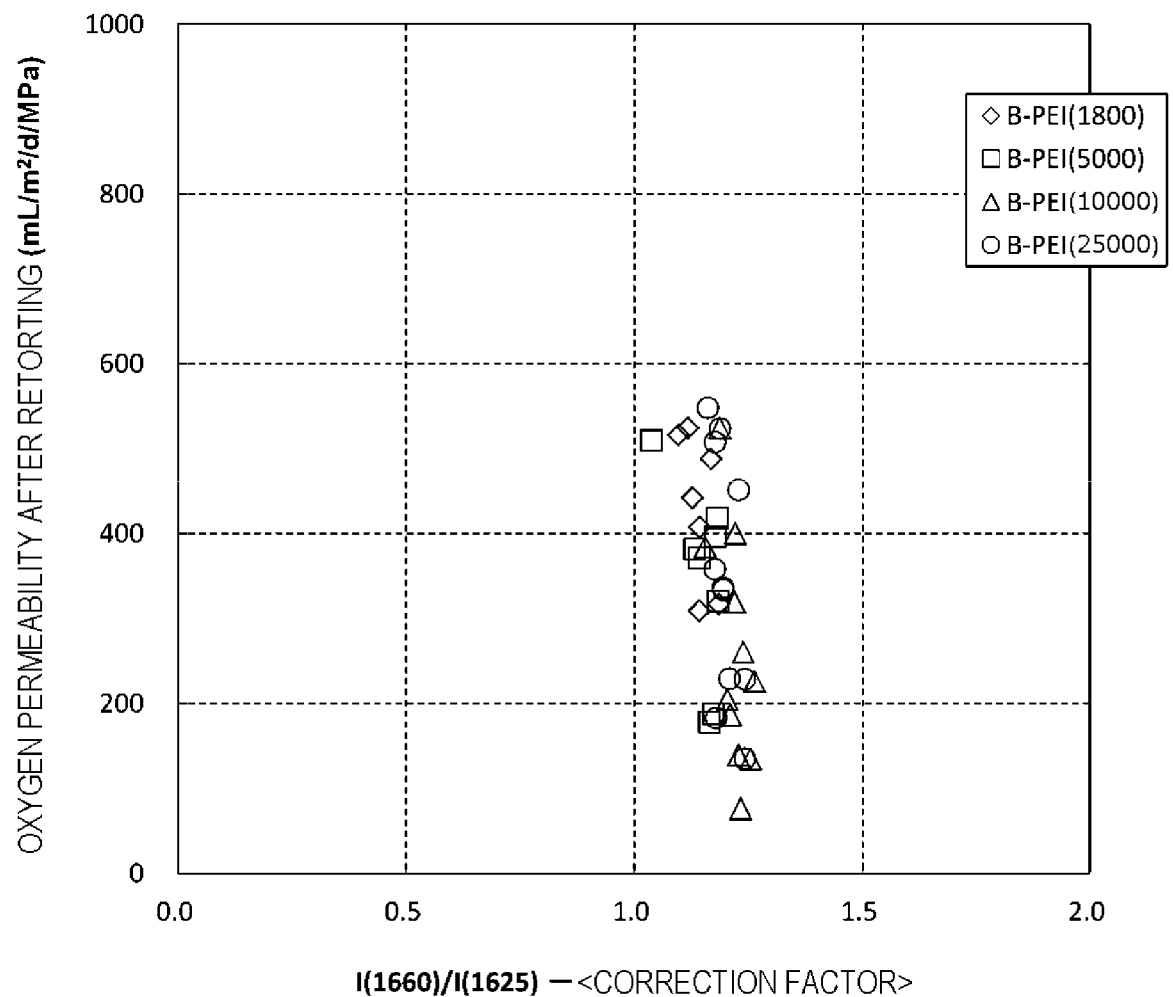
FIG. 4 is a diagram showing evaluation results of a gas barrier polymer in an Experimental Example.

The oxygen permeability of each multilayer film after the retort treatment was measured using OX-TRAN 2/21 manufactured by Mocon Inc., in accordance with JIS K 7126 under conditions of a temperature of 20° C. and a humidity of 90% RH. The results are shown in FIG. 3, FIG. 4, Table 2, and Table 3.

TABLE 2

| | Coating solution | Total amine/ COOH | Heating temperature (° C.) | Heating time (seconds) | Amide ratio | I(1660)/I(1625) | Correct baseline to 1 Y = 0.65x + 0.4225 I(1660)/I(1625) after correction | Oxygen permeability after retorting (average value) (ml/m²/day/MPa) |
|---|---|---|---|---|---|---|---|---|
| 1 | X1-1 | 0.45 | 200 | 240 | 0.418 | 1.140 | 1.01 | 303.4 |
| 2 | X2-1 | 0.43 | 200 | 180 | 0.414 | 1.263 | 1.12 | 444.3 |
| 3 | | 0.43 | 200 | 240 | 0.404 | 1.233 | 1.09 | 385.2 |
| 4 | | 0.43 | 200 | 360 | 0.448 | 1.259 | 1.12 | 150.3 |
| 5 | X2-2 | 0.52 | 200 | 180 | 0.386 | 1.131 | 1.05 | 536.7 |
| 6 | | 0.52 | 200 | 240 | 0.422 | 1.167 | 1.08 | 435.8 |
| 7 | | 0.52 | 200 | 360 | 0.447 | 1.200 | 1.12 | 275.4 |
| 8 | X2-3 | 0.61 | 200 | 360 | 0.411 | 1.174 | 1.15 | 488.7 |
| 9 | X3-1 | 0.45 | 200 | 120 | 0.366 | 1.292 | 1.16 | 528.4 |
| 10 | | 0.45 | 200 | 180 | 0.374 | 1.294 | 1.16 | 407.0 |
| 11 | | 0.45 | 200 | 240 | 0.402 | 1.350 | 1.22 | 192.0 |
| 12 | | 0.45 | 200 | 360 | 0.444 | 1.384 | 1.25 | 126.1 |
| 13 | X3-2 | 0.55 | 200 | 180 | 0.365 | 1.148 | 1.08 | 516.3 |
| 14 | | 0.55 | 200 | 240 | 0.398 | 1.176 | 1.11 | 410.9 |
| 15 | | 0.55 | 200 | 360 | 0.434 | 1.202 | 1.14 | 125.7 |
| 16 | X3-3 | 0.65 | 200 | 240 | 0.342 | 1.157 | 1.16 | 516.2 |
| 17 | | 0.65 | 200 | 360 | 0.399 | 1.187 | 1.19 | 149.2 |
| 18 | X4-1 | 0.42 | 200 | 120 | 0.363 | 1.311 | 1.16 | 528.9 |
| 19 | | 0.42 | 200 | 180 | 0.402 | 1.304 | 1.15 | 385.1 |
| 20 | | 0.42 | 200 | 240 | 0.427 | 1.392 | 1.24 | 266.6 |
| 21 | | 0.42 | 200 | 360 | 0.431 | 1.367 | 1.22 | 235.8 |
| 22 | X4-2 | 0.51 | 200 | 180 | 0.370 | 1.237 | 1.15 | 499.2 |
| 23 | | 0.51 | 200 | 240 | 0.375 | 1.250 | 1.16 | 399.9 |
| 24 | | 0.51 | 200 | 360 | 0.431 | 1.300 | 1.21 | 239.1 |
| 25 | X4-3 | 0.61 | 200 | 360 | 0.445 | 1.232 | 1.21 | 356.2 |
| 26 | X5-1 | 0.45 | 200 | 120 | 0.380 | 1.282 | 1.15 | 469.2 |
| 27 | | 0.45 | 200 | 180 | 0.384 | 1.289 | 1.16 | 201.1 |
| 28 | | 0.45 | 200 | 240 | 0.424 | 1.353 | 1.22 | 174.9 |
| 29 | | 0.45 | 200 | 360 | 0.435 | 1.357 | 1.23 | 161.0 |
| 30 | X5-2 | 0.55 | 200 | 120 | 0.363 | 1.197 | 1.13 | 539.0 |
| 31 | | 0.55 | 200 | 180 | 0.389 | 1.211 | 1.15 | 221.1 |
| 32 | | 0.55 | 200 | 240 | 0.400 | 1.274 | 1.21 | 287.8 |
| 33 | | 0.55 | 200 | 360 | 0.442 | 1.282 | 1.22 | 159.4 |
| 34 | X5-3 | 0.65 | 200 | 180 | 0.370 | 1.130 | 1.13 | 449.2 |
| 35 | | 0.65 | 200 | 240 | 0.411 | 1.192 | 1.19 | 453.3 |
| 36 | | 0.65 | 200 | 360 | 0.421 | 1.259 | 1.26 | 181.6 |
| 37 | X7-1 | 0.315 | 200 | 60 | 0.380 | 1.180 | 0.96 | 801.6 |
| 38 | | 0.315 | 200 | 120 | 0.403 | 1.042 | 0.82 | 795.5 |
| 39 | | 0.315 | 200 | 180 | 0.416 | 1.039 | 0.82 | 761.2 |
| 40 | | 0.315 | 200 | 240 | 0.413 | 0.972 | 0.75 | 736.4 |
| 41 | | 0.315 | 200 | 360 | 0.412 | 0.934 | 0.72 | 702.1 |
| 42 | X7-2 | 0.385 | 200 | 120 | 0.382 | 1.086 | 0.91 | 736.6 |
| 43 | | 0.385 | 200 | 180 | 0.368 | 0.962 | 0.79 | 676.9 |
| 44 | | 0.385 | 200 | 240 | 0.371 | 0.908 | 0.74 | 645.2 |
| 45 | X7-3 | 0.455 | 200 | 60 | 0.355 | 1.090 | 0.96 | 757.2 |
| 46 | | 0.455 | 200 | 120 | 0.383 | 0.965 | 0.84 | 733.1 |
| 47 | | 0.455 | 200 | 180 | 0.384 | 0.921 | 0.79 | 653.5 |
| 48 | | 0.455 | 200 | 240 | 0.392 | 0.853 | 0.73 | 626.5 |

TABLE 3

| | Coating solution | Total amine/ COOH | Heating temperature (° C.) | Heating time (seconds) | Amide ratio | I(1660)/I(1625) | Correct baseline to 1 Y = 0.65x + 0.4225 I(1660)/I(1625) after correction | Oxygen permeability after retorting (average value) (ml/m²/day/MPa) |
|---|---|---|---|---|---|---|---|---|
| 1 | V1-1 | 0.45 | 200 | 180 | 0.368 | 1.248 | 1.12 | 524.4 |
| 2 | | 0.45 | 200 | 240 | 0.387 | 1.257 | 1.13 | 442.1 |
| 3 | | 0.45 | 200 | 360 | 0.414 | 1.273 | 1.14 | 309.2 |
| 4 | V1-2 | 0.55 | 200 | 240 | 0.375 | 1.233 | 1.17 | 487.9 |
| 5 | | 0.55 | 200 | 360 | 0.398 | 1.250 | 1.19 | 317.1 |
| 6 | V1-3 | 0.65 | 200 | 240 | 0.353 | 1.097 | 1.10 | 516.4 |
| 7 | | 0.65 | 200 | 360 | 0.385 | 1.143 | 1.14 | 407.5 |
| 8 | V2-1 | 0.43 | 200 | 180 | 0.384 | 1.320 | 1.18 | 396.2 |
| 9 | | 0.43 | 200 | 240 | 0.411 | 1.327 | 1.18 | 320.3 |
| 10 | | 0.43 | 200 | 360 | 0.444 | 1.317 | 1.17 | 187.7 |
| 11 | V2-2 | 0.52 | 200 | 120 | 0.344 | 1.122 | 1.04 | 509.7 |

TABLE 3-continued

| Coating solution | Total amine/ COOH | Heating temperature (° C.) | Heating time (seconds) | Amide ratio | I(1660)/I(1625) | Correct baseline to 1 Y = 0.65x + 0.4225 I(1660)/I(1625) after correction | Oxygen permeability after retorting (average value) (ml/m²/day/MPa) |
|---|---|---|---|---|---|---|---|
| 12 |  | 0.52 | 200 | 180 | 0.374 | 1.227 | 1.14 | 371.4 |
| 13 |  | 0.52 | 200 | 240 | 0.378 | 1.217 | 1.13 | 381.3 |
| 14 |  | 0.52 | 200 | 360 | 0.406 | 1.250 | 1.17 | 178.3 |
| 15 V2-3 | 0.61 | 200 | 360 | 0.406 | 1.208 | 1.18 | 417.9 |
| 16 V3-1 | 0.45 | 200 | 120 | 0.373 | 1.350 | 1.22 | 319.5 |
| 17 | 0.45 | 200 | 180 | 0.388 | 1.368 | 1.24 | 260.7 |
| 18 | 0.45 | 200 | 240 | 0.393 | 1.341 | 1.21 | 186.8 |
| 19 | 0.45 | 200 | 360 | 0.422 | 1.385 | 1.25 | 135.1 |
| 20 V3-2 | 0.55 | 200 | 120 | 0.381 | 1.220 | 1.16 | 384.4 |
| 21 | 0.55 | 200 | 180 | 0.400 | 1.269 | 1.20 | 204.8 |
| 22 | 0.55 | 200 | 240 | 0.414 | 1.293 | 1.23 | 139.2 |
| 23 | 0.55 | 200 | 360 | 0.441 | 1.298 | 1.23 | 76.3 |
| 24 V3-3 | 0.65 | 200 | 180 | 0.338 | 1.188 | 1.19 | 524.4 |
| 25 | 0.65 | 200 | 240 | 0.358 | 1.221 | 1.22 | 399.9 |
| 26 | 0.65 | 200 | 360 | 0.395 | 1.263 | 1.26 | 226.4 |
| 27 V4-1 | 0.42 | 200 | 120 | 0.386 | 1.327 | 1.18 | 507.4 |
| 28 | 0.42 | 200 | 180 | 0.402 | 1.327 | 1.18 | 357.9 |
| 29 | 0.42 | 200 | 240 | 0.413 | 1.345 | 1.20 | 333.6 |
| 30 | 0.42 | 200 | 360 | 0.440 | 1.329 | 1.18 | 183.1 |
| 31 V4-2 | 0.51 | 200 | 120 | 0.356 | 1.279 | 1.19 | 523.4 |
| 32 | 0.51 | 200 | 180 | 0.387 | 1.286 | 1.19 | 336.2 |
| 33 | 0.51 | 200 | 240 | 0.403 | 1.300 | 1.21 | 229.2 |
| 34 | 0.51 | 200 | 360 | 0.442 | 1.333 | 1.24 | 135.0 |
| 35 V4-3 | 0.61 | 200 | 180 | 0.311 | 1.188 | 1.16 | 548.2 |
| 36 | 0.61 | 200 | 240 | 0.363 | 1.255 | 1.23 | 451.3 |
| 37 | 0.61 | 200 | 360 | 0.402 | 1.268 | 1.24 | 228.7 |

Experimental Example 2

Figure 5:
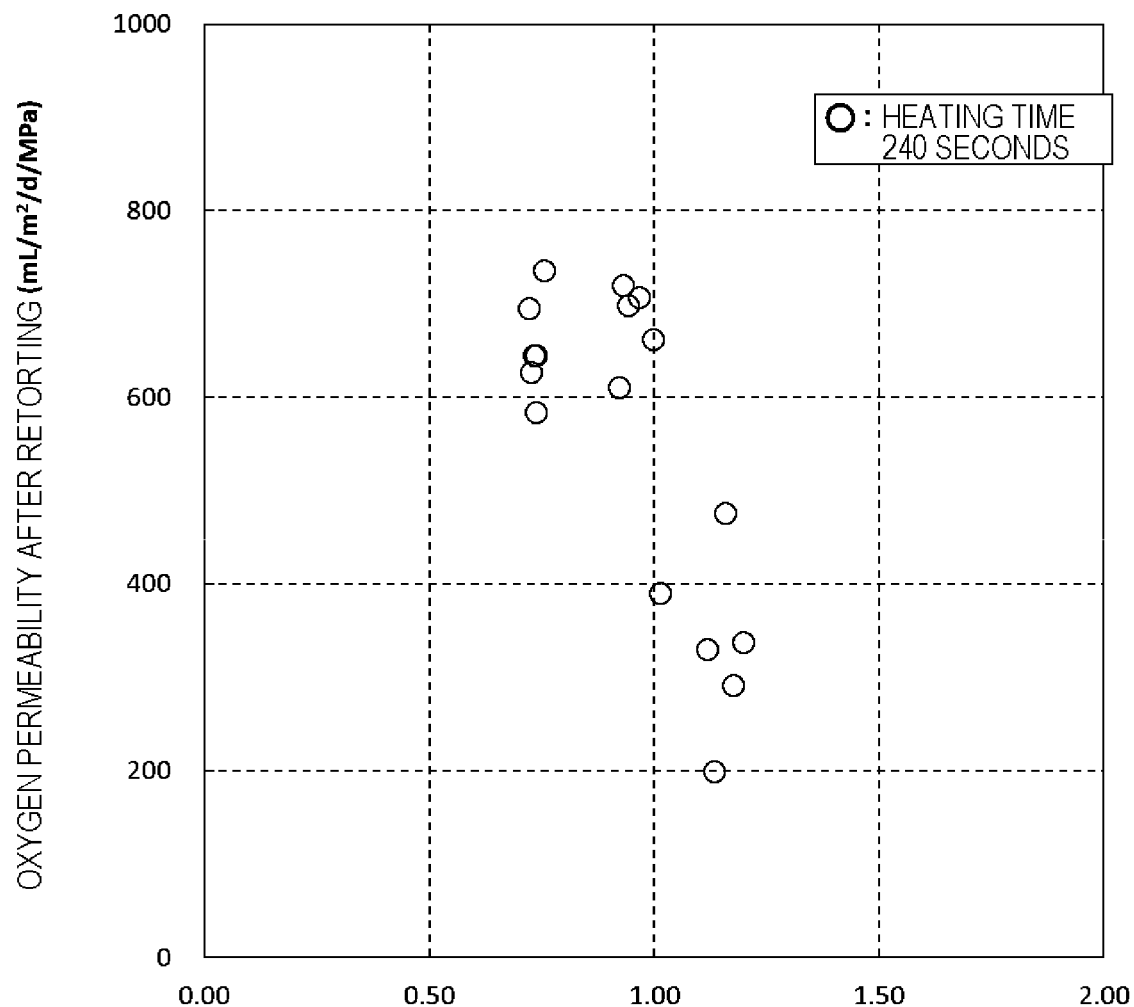
FIG. 5 is a diagram showing evaluation results of a gas barrier polymer in an Experimental Example.

In accordance with Experimental Example 1, various types of polycarboxylic acids and polyamine compounds were mixed and, in all cases, laminates were prepared and evaluated with a heating time of 240 seconds after coating the coating solution. The results are shown in Table 4 and FIG. 5.

Experimental Example 3

In this Example, a gas barrier laminate including an inorganic material layer was prepared and evaluated.

One of the following was used as the base material layer.

Base material layer 1: PET film
Base material layer 2: PET film with undercoat layer

TABLE 4

| Coating solution | Total amine/ COOH | Heating temperature (° C.) | Heating time (seconds) | Amide ratio | I(1660)/I(1625) | Correct baseline to 1 Y = 0.65x + 0.4225 I(1660)/I(1625) after correction | Oxygen permeability after retorting (average value) (ml/m²/day/MPa) |
|---|---|---|---|---|---|---|---|
| 1 X3-1 | 0.45 | 200 | 240 | 0.412 | 1.262 | 1.13 | 199.7 |
| 2 X3-2 | 0.55 | 200 | 240 | 0.400 | 1.182 | 1.12 | 330.5 |
| 3 | 0.55 | 200 | 240 | 0.372 | 1.262 | 1.20 | 338.0 |
| 4 X3-3 | 0.65 | 200 | 240 | 0.342 | 1.157 | 1.16 | 476.3 |
| 5 X6-1 | 0.42 | 200 | 240 | 0.419 | 1.162 | 1.01 | 390.0 |
| 6 X6-2 | 0.51 | 200 | 240 | 0.418 | 1.013 | 0.92 | 610.6 |
| 7 X6-3 | 0.61 | 200 | 240 | 0.390 | 1.023 | 1.00 | 662.3 |
| 8 X8-1 | 0.315 | 200 | 240 | 0.411 | 0.954 | 0.74 | 584.5 |
| 9 X8-2 | 0.385 | 200 | 240 | 0.367 | 0.905 | 0.73 | 645.6 |
| 10 X8-3 | 0.455 | 200 | 240 | 0.341 | 0.848 | 0.72 | 695.6 |
| 11 X7-1 | 0.315 | 200 | 240 | 0.413 | 0.972 | 0.75 | 736.4 |
| 12 X7-2 | 0.385 | 200 | 240 | 0.371 | 0.908 | 0.74 | 645.2 |
| 13 X7-3 | 0.455 | 200 | 240 | 0.392 | 0.853 | 0.73 | 626.5 |
| 14 X9-1 | 0.315 | 200 | 240 | 0.399 | 1.148 | 0.93 | 719.7 |
| 15 X9-2 | 0.385 | 200 | 240 | 0.392 | 1.138 | 0.97 | 707.1 |
| 16 X9-3 | 0.455 | 200 | 240 | 0.383 | 1.068 | 0.94 | 698.8 |
| 17 V3-2 | 0.55 | 200 | 240 | 0.380 | 1.240 | 1.18 | 292.1 |

As the base material layer 1, a biaxial stretched polyethylene terephthalate film (manufactured by Unitika Ltd., trade name PET12) with a thickness of 12 μm was used. The base material layer 2 was prepared by the procedure described below. First, a urethane-based undercoat layer was coated on a corona-treated surface of a biaxial stretched polyethylene terephthalate film (manufactured by Unitika Ltd., trade name PET12) with a thickness of 12 μm using a roll coater such that the coating amount after drying was 0.2 g/m² to obtain a PET film with an undercoat layer.

Furthermore, on the corona-treated surface of the base material layer 1, an aluminum oxide film with a thickness of 7 nm was formed as an inorganic material layer by heating and evaporating aluminum using a roll deposition apparatus with a high-frequency induction heating system and then carrying out deposition while introducing oxygen. In addition, the inorganic material layer was also formed on the undercoat layer of the base material layer 2 under the same conditions as base material layer 1.

Coating solutions (X3-2) and (V3-2) were prepared in accordance with Experimental Example 1. A predetermined amount of the coating solution was coated using a roll coater equipped with an air-floating type heating furnace to the surface where the inorganic material layer was formed on the base material layer 1 or base material layer 2, and the gas barrier layer was formed by carrying out a heat treatment at 210° C. for a predetermined time to obtain a gas barrier laminate containing the inorganic material layer. The heat treatment time was set as the time to pass through the heating zone set at 210° C. and was calculated from the length of the heating zone and the transport speed of the base material.

Figure 6:
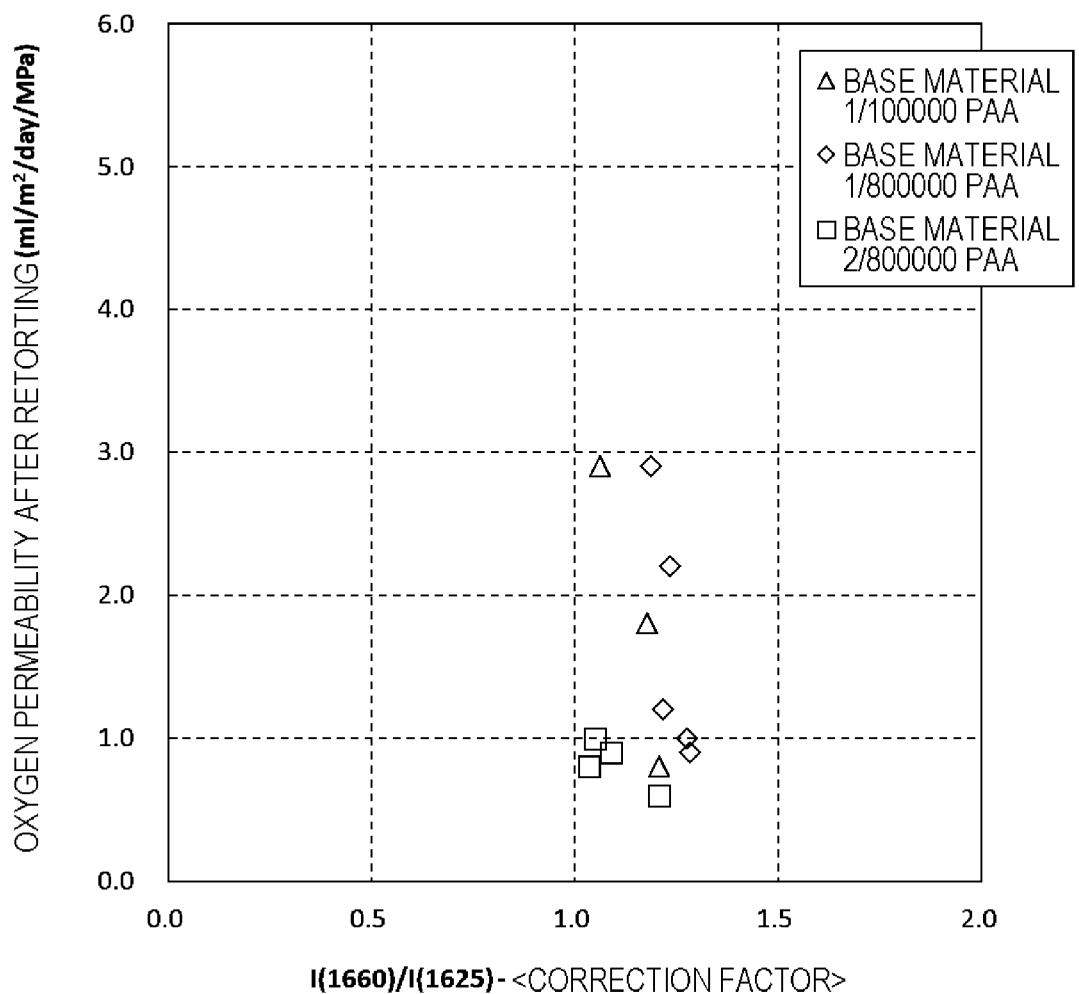
FIG. 6 is a diagram showing evaluation results of a gas barrier polymer in an Experimental Example.

The obtained gas barrier laminates were subjected to infrared measurement and analysis in the same manner as in Experimental Example 1. However, for the difference spectrum analysis, which removes the influence of the base material, the base material 1 and the base material 2 formed with inorganic material layers were used instead of the PET base material. In addition, in the same manner as in Experimental Example 1, a multilayer film combined with a 70 μm thick, unstretched polypropylene film was prepared and evaluated for oxygen permeability after a retort treatment. The results are shown in Table 5 and FIG. 6.

This application claims priority based on Japanese Patent Application No. 2018-243757 filed Dec. 26, 2018, the disclosure of which is incorporated herein in its entirety.

REFERENCE SIGNS LIST

100: Gas barrier laminate
101: Base material layer
102: Inorganic material layer
103: Gas barrier layer

The invention claimed is:

1. A gas barrier polymer formed by heat-curing a mixture including polycarboxylic acid and a polyamine compound,
wherein, in an infrared absorption spectrum of the gas barrier polymer, when a straight line connecting a measurement point at 1493 cm$^{-1}$ and a measurement point at 1780 cm$^{-1}$ is set as a baseline, an absorption intensity at 1660 cm$^{-1}$ is set as I(1660), and an absorption intensity at 1625 cm$^{-1}$ is set as I(1625),
R represented by Equation (1) is greater than 1, $$R = I(1660)/I(1625) - \{-0.65 \times (\text{total amine/COOH}) + 0.4225\} \quad (1)$$

in Equation (1), "total amine" is a total number of moles of primary, secondary, and tertiary amino groups included in the polyamine compound in the mixture, and "COOH" is the number of moles of —COOH groups included in the polycarboxylic acid in the mixture,
wherein a weight average molecular weight of the polycarboxylic acid is equal to or more than $5 \times 10^5$ and equal to or less than $2 \times 10^6$, and
wherein (total of the number of moles of —NH groups and the number of moles of —NH$_2$ groups included in the polyamine compound in the mixture)/(the number of moles of —COOH groups included in the polycarboxylic acid in the mixture) is 0.28 to 0.42.

2. The gas barrier polymer according to claim 1, wherein the polycarboxylic acid includes one or two or more polymers selected from the group consisting of polyacrylic acid, polymethacrylic acid, and a copolymer of acrylic acid and methacrylic acid.

TABLE 5

| | Base material layer | Inorganic material layer (thickness) | Coating solution | Total amine/ COOH | Coating amount (g/m²) | Heating temperature (° C.) | Heating time (seconds) | Amide ratio | I(1660)/I(1625) | Correct baseline to 1 Y = 0.65x + 0.4225 I(1660)/I(1625) after correction | Oxygen permeability after retorting (average value) (ml/m²/day/MPa) |
|---|---|---|---|---|---|---|---|---|---|---|---|
| 1 | Base | Aluminum | X3-2 | 0.55 | 0.31 | 210 | 26 | 0.34 | 1.13 | 1.06 | 2.9 |
| 2 | material | oxide | | 0.55 | 0.31 | 210 | 54 | 0.37 | 1.24 | 1.18 | 1.8 |
| 3 | layer 1 | (7 nm) | | 0.55 | 0.31 | 210 | 100 | 0.41 | 1.27 | 1.21 | 0.8 |
| 4 | | | | 0.55 | 0.25 | 210 | 6 | 0.31 | 1.25 | 1.19 | 2.9 |
| 5 | | | | 0.55 | 0.25 | 210 | 13 | 0.31 | 1.30 | 1.23 | 2.2 |
| 6 | | | | 0.55 | 0.25 | 210 | 26 | 0.34 | 1.28 | 1.22 | 1.2 |
| 7 | | | | 0.55 | 0.25 | 210 | 54 | 0.36 | 1.34 | 1.28 | 1 |
| 8 | | | | 0.55 | 0.25 | 210 | 100 | 0.39 | 1.35 | 1.28 | 0.9 |
| 9 | Base | Aluminum | V3-2 | 0.55 | 0.24 | 210 | 6 | 0.28 | 1.10 | 1.04 | 0.8 |
| 10 | material | oxide | | 0.55 | 0.29 | 210 | 13 | 0.30 | 1.11 | 1.05 | 1 |
| 11 | layer 2 | (7 nm) | | 0.55 | 0.32 | 210 | 26 | 0.32 | 1.15 | 1.09 | 0.9 |
| 12 | | | | 0.55 | 0.32 | 210 | 54 | 0.36 | 1.27 | 1.21 | 0.6 |

3. The gas barrier polymer according to claim 1,
wherein the polyamine compound includes a branched polyamine.

4. The gas barrier polymer according to claim 1,
wherein (total amine/COOH) in Equation (1) is equal to or more than 0.4 and equal to or less than 0.7.

5. The gas barrier polymer according to claim 1,
wherein, in the infrared absorption spectrum of the gas barrier polymer,
when a straight line connecting a measurement point at 1493 cm$^{-1}$ and a measurement point at 1780 cm$^{-1}$ is set as a baseline,
a total peak area in a range of an absorption band of equal to or more than 1493 cm$^{-1}$ and equal to or less than 1780 cm$^{-1}$ is set as A, and
a total peak area in a range of an absorption band of equal to or more than 1598 cm$^{-1}$ and equal to or less than 1690 cm$^{-1}$ is set as B,
an area ratio of an amide bond as represented by (B/A) is less than 0.370.

6. The gas barrier polymer according to claim 1,
wherein the polycarboxylic acid includes one or two or more polymers selected from the group consisting of polyacrylic acid, polymethacrylic acid, and a copolymer of acrylic acid and methacrylic acid, and
the polyamine compound includes a branched polyamine.

7. The gas barrier polymer according to claim 1,
wherein the polycarboxylic acid includes one or two or more polymers selected from the group consisting of polyacrylic acid, polymethacrylic acid, and a copolymer of acrylic acid and methacrylic acid,
the polyamine compound includes a branched polyamine, and
(total amine/COOH) in Equation (1) is equal to or more than 0.4 and equal to or less than 0.7.

8. The gas barrier polymer according to claim 1,
wherein the polycarboxylic acid includes one or two or more polymers selected from the group consisting of polyacrylic acid, polymethacrylic acid, and a copolymer of acrylic acid and methacrylic acid,
the polyamine compound includes a branched polyamine,
(total amine/COOH) in Equation (1) is equal to or more than 0.4 and equal to or less than 0.7,
the weight average molecular weight of the polycarboxylic acid is equal to or more than $5 \times 10^5$ and equal to or less than $1.3 \times 10^6$, and
(total of the number of moles of —NH groups and the number of moles of —NH$_2$ groups included in the polyamine compound in the mixture)/(the number of moles of —COOH groups included in the polycarboxylic acid in the mixture) is 0.31 to 0.42.

9. A gas barrier laminate comprising:
a base material layer; and
a gas barrier layer provided on at least one surface of the base material layer and including the gas barrier polymer according to claim 1.

* * * * *